(12) United States Patent
Weinberg et al.

(10) Patent No.: US 8,977,378 B2
(45) Date of Patent: Mar. 10, 2015

(54) SYSTEMS AND METHODS OF USING A HIEROGLYPHIC MACHINE INTERFACE LANGUAGE FOR COMMUNICATION WITH AUXILIARY ROBOTICS IN RAPID FABRICATION ENVIRONMENTS

(71) Applicant: Northeastern University, Boston, MA (US)

(72) Inventors: Brian Weinberg, San Diego, CA (US); Constantinos Mavroidis, Arlington, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 14/212,267

(22) Filed: Mar. 14, 2014

(65) Prior Publication Data
US 2014/0277679 A1 Sep. 18, 2014

Related U.S. Application Data

(60) Provisional application No. 61/792,917, filed on Mar. 15, 2013, provisional application No. 61/788,545, filed on Mar. 15, 2013.

(51) Int. Cl.
*G06F 19/00* (2011.01)
*G06F 7/00* (2006.01)
(Continued)

(52) U.S. Cl.
CPC ........... *B29C 67/0051* (2013.01); *B25J 9/1602* (2013.01); *Y10S 901/02* (2013.01); *Y10S 901/15* (2013.01); *Y10S 901/28* (2013.01); *Y10S 901/30* (2013.01)

USPC ........... 700/120; 700/215; 700/245; 382/100; 382/153; 382/218; 901/2; 901/15; 901/28; 901/30

(58) Field of Classification Search
USPC .............. 700/214, 245, 250, 251; 901/47, 50; 382/100, 103, 153, 154, 218
See application file for complete search history.

(56) References Cited

U.S. PATENT DOCUMENTS

| 4,575,330 A | 3/1986 | Hull |
| 5,121,329 A | 6/1992 | Crump |

(Continued)

OTHER PUBLICATIONS

A. Jain and C. Kemp, Pulling Open Doors and Drawers: Coordinating an Omni-directional Base and a Compliant Arm with Equilibrium Point Control, 2010, searched online at http://www.hsi.gatech.edu/hrl/epc-icra10.shtml, IEEE International Conference on Robotics and Automation (ICRA), 8 pages.

(Continued)

*Primary Examiner* — Darrin Dunn
(74) *Attorney, Agent, or Firm* — John D. Lanza; Foley & Lardner LLP (57) ABSTRACT

Disclosed are methods and systems for using hieroglyphs for communication in a rapid fabrication environment. The method includes receiving, by a control system for an articulated robotic arm, one or more images of a fabrication machine build space. The method includes identifying, by the control system, a hieroglyph present in the one or more images and translating the identified hieroglyph into one or more instructions for manipulation of the articulated robotic arm. The method includes causing the articulated robotic arm to carry out the instructions translated from the identified hieroglyph. Accordingly foreign objects are inserted into fabricated objects during an automated rapid fabrication process without extensive redesign of the rapid fabrication machine. In some implementations, an unmodified third-party stereolithographic rapid fabrication machine can be used.

20 Claims, 7 Drawing Sheets

(51) Int. Cl.
*G06K 9/00* (2006.01)
*G06K 9/68* (2006.01)
*B29C 67/00* (2006.01)
*B25J 9/16* (2006.01)

(56) References Cited

U.S. PATENT DOCUMENTS

| | | | |
|---|---|---|---|
| 5,204,055 | A | 4/1993 | Sachs et al. |
| 5,387,380 | A | 2/1995 | Cima et al. |
| 5,556,590 | A | 9/1996 | Hull |
| 6,314,631 | B1* | 11/2001 | Pryor ........................ 29/407.04 |
| 8,194,914 | B1* | 6/2012 | Skogg et al. ................. 382/100 |
| 2001/0056313 | A1* | 12/2001 | Osborne, Jr. ................. 700/245 |
| 2007/0265724 | A1* | 11/2007 | Mifsud et al. ................. 700/115 |
| 2008/0024532 | A1* | 1/2008 | Kim ................................. 347/9 |
| 2008/0085048 | A1* | 4/2008 | Venetsky et al. ............. 382/153 |
| 2013/0002828 | A1* | 1/2013 | Ding et al. ...................... 348/49 |
| 2013/0015596 | A1 | 1/2013 | Mozeika et al. |
| 2013/0034295 | A1* | 2/2013 | Tsuchinaga et al. .......... 382/153 |
| 2013/0241819 | A1* | 9/2013 | Yamashita .................... 345/156 |
| 2014/0012415 | A1* | 1/2014 | Benaim et al. ................ 700/248 |
| 2014/0047143 | A1* | 2/2014 | Bateman et al. ................. 710/72 |
| 2014/0098093 | A2* | 4/2014 | Haker et al. .................. 345/420 |
| 2014/0098220 | A1* | 4/2014 | Nunnink et al. .............. 348/135 |
| 2014/0117586 | A1* | 5/2014 | Bonassar et al. ............. 264/401 |
| 2014/0177922 | A1* | 6/2014 | Boncyk et al. ................ 382/103 |

OTHER PUBLICATIONS

C. Tse and Y. Chen, A Robotic System for Rapid Prototyping, Apr. 1997, IEEE Conf. on Robotics and Automation.

De Laurentis, K. et al., Rapid Robot Reproduction, Jun. 2004, IEEE Robotics & Automation Magazine, pp. 86-92.

Mariottini, Gian et al., Image-Based Visual Servoing for Nonholonomic Mobile Robots Using Epipolar Geometry,IEEE Transaction on Robotics, vol. 23, No. 1, Feb. 2007, pp. 87-100.

Mavroidis C. et al., Fabrication of Non-Assembly Mechanisms and Robotic Systems using Rapid Prototyping, vol. 123, Dec. 2001, Journal of Mechanical Design, pp. 516-524.

Suing et al., A New Contour-Based Approach to Object Recognition for Assembly Line Robots, 2001 Pattern Recognition. Springer Berlin Heidelberg, 2001, pp. 329-336.

* cited by examiner

SYSTEMS AND METHODS OF USING A HIEROGLYPHIC MACHINE INTERFACE LANGUAGE FOR COMMUNICATION WITH AUXILIARY ROBOTICS IN RAPID FABRICATION ENVIRONMENTS

CROSS-REFERENCE TO RELATED APPLICATIONS

This application claims the benefit of and priority to U.S. Provisional Patent Application No. 61/788,545, filed on Mar. 15, 2013, and titled "Hieroglyphic Machine Interface Language (HMIL) for Real-time Control and Programming of Robotics," which is incorporated herein by reference in the entirety for all purposes. This application also claims the benefit of and priority to U.S. Provisional Patent Application No. 61/792,917, filed on Mar. 15, 2013, and titled "Hieroglyphic Machine Interface Language (HMIL) for Real-time Control and Programming of Robotic Systems," which is incorporated herein by reference in the entirety for all purposes.

BACKGROUND

Rapid fabrication environments use mechanical systems to construct tangible objects from digital model representations. Rapid fabrication may also be referred to as rapid prototyping or as three-dimensional printing. The digital model representations are usually stored as computer files, e.g., as computer-aided design (CAD) files or STL files.

Two example systems for rapid fabrication are stereolithography machines and fused deposition machines, which are both forms of additive manufacturing. In stereolithography, a thin layer of a photo-reactive resin is cured using a laser, whereas in fused deposition, small amounts of a material are deposited by an extruder. In general, rapid fabrication builds an object out of a single source material. For example, in stereolithography, the resulting object is made entirely from the photo-reactive resin. See, for example, U.S. Pat. No. 5,556,590 issued in 1996 to Charles W. Hull, titled "Apparatus for production of three-dimensional objects by stereolithography." In fused deposition systems, the resulting object is made entirely from the deposited material. See, for example, U.S. Pat. No. 5,121,329 issued in 1992 to S. Scott Crump, titled "Apparatus and method for creating three-dimensional objects."

SUMMARY

In one aspect, the disclosure relates to a method of using hieroglyphs for communication in a rapid fabrication environment. The method includes receiving, by a control system for an articulated robotic arm, one or more images of a fabrication machine build space. The method includes identifying, by the control system, a hieroglyph present in the one or more images and translating, by the control system, the identified hieroglyph into one or more instructions for manipulation of the articulated robotic arm. The method includes causing, by the control system, the articulated robotic arm to carry out the instructions translated from the identified hieroglyph.

In some implementations, the method includes identifying the hieroglyph as one of a plurality of hieroglyphs in a vocabulary for a Hieroglyphic Machine Interface Language. In some implementations, the hieroglyph is a symbol that includes a base symbol and one or more additional modifier symbols, and in some such implementations the method includes identifying one or more values associated with the one or more additional modifier symbols. In some implementations, the method includes classifying the identified hieroglyph as one of: a sequence start indicator, an object identifier, an object orientation identifier, an insertion location, an insertion approach vector, a begin insertion indicator, or a sequence terminator. In some implementations, such classifying is based on a base symbol in the identified hieroglyph.

In some implementations, the method includes receiving the one or more images from a digital camera, wherein the digital camera is configured to obtain the one or more images of the fabrication machine build space at a predetermined frame rate that is at least as fast as a laser beam movement rate used by a fabrication machine comprising the fabrication machine build space. In some implementations, the one or more images are received from a vision system. In some implementations, the vision system is configured to recognize the hieroglyph from a sequence of images obtained by the digital camera, where no single image in the sequence of images contains a complete image of the hieroglyph. In some implementations, the method includes detecting the presence of the hieroglyph in a pattern traced by a laser beam used by the fabrication machine.

In some implementations, the method includes waiting, prior to causing the articulated robotic arm to carry out instructions, to receive an additional hieroglyph; wherein causing the robotic arm to carry out instructions is responsive to receiving the additional hieroglyph. In some implementations, the hieroglyph is part of a series of hieroglyphs and the additional hieroglyph is either a begin insertion indicator or a sequence terminator.

In some implementations, causing, by the control system, the articulated robotic arm to carry out the instructions translated from the identified hieroglyph includes executing the one or more instructions to insert an object into the fabrication machine build space. In some implementations, the method includes causing the articulated robotic arm to carry out an insertion completion sequence. In some implementations, the insertion completion sequence includes causing an end of the articulated robotic arm to move out of the fabrication machine build space. In some implementations, the insertion completion sequence includes causing an end of the articulated robotic arm to move into a designated space. In some implementations, the insertion completion sequence includes causing an end of the articulated robotic arm to press a button or otherwise complete an electrical link signaling the fabrication machine to resume a build process. In some implementations, the insertion completion sequence includes closing a door attached to the fabrication machine. In some implementations, the control system is not otherwise communicatively coupled to a rapid fabrication machine in the rapid fabrication environment.

In one aspect, the disclosure relates to system using hieroglyphs for communication in a rapid fabrication environment. The system includes a digital camera, an articulated robotic arm, and a control system for the articulated robotic arm. The control system is configured to perform operations of receiving one or more images of a fabrication machine build space, identifying a hieroglyph present in the one or more images, translating the identified hieroglyph into one or more instructions for manipulation of the articulated robotic arm, and causing the articulated robotic arm to carry out the instructions translated from the identified hieroglyph. In some implementations, the control system is a computing system comprising memory storing instructions and one or more computer processors configured to execute instructions stored in the memory.

In some implementations, the control system is configured to identify the hieroglyph as one of a plurality of hieroglyphs in a vocabulary for a Hieroglyphic Machine Interface Language. In some implementations, the hieroglyph is a symbol that includes a base symbol and one or more additional modifier symbols, and in some such implementations the control system is configured to identify one or more values associated with the one or more additional modifier symbols. In some implementations, the control system is configured to classify the identified hieroglyph as one of: a sequence start indicator, an object identifier, an object orientation identifier, an insertion location, an insertion approach vector, a begin insertion indicator, or a sequence terminator. In some implementations, such classifying is based on a base symbol in the identified hieroglyph.

In some implementations, the control system is configured to receive the one or more images from the digital camera, wherein the digital camera is configured to obtain the one or more images of the fabrication machine build space at a predetermined frame rate that is at least as fast as a laser beam movement rate used by a fabrication machine comprising the fabrication machine build space. In some implementations, the one or more images are received from a vision system. In some implementations, the vision system is configured to recognize the hieroglyph from a sequence of images obtained by the digital camera, where no single image in the sequence of images contains a complete image of the hieroglyph. In some implementations, the vision system or the control system is configured to detect the presence of the hieroglyph in a pattern traced by a laser beam used by the fabrication machine.

In some implementations, the control system is configured to wait, prior to causing the articulated robotic arm to carry out instructions, to receive an additional hieroglyph; wherein causing the robotic arm to carry out instructions is responsive to receiving the additional hieroglyph. In some implementations, the hieroglyph is part of a series of hieroglyphs and the additional hieroglyph is either a begin insertion indicator or a sequence terminator.

In some implementations, the control system is configured to cause the articulated robotic arm to carry out the instructions translated from the identified hieroglyph by executing the one or more instructions to insert an object into the fabrication machine build space. In some implementations, the control system is configured to cause the articulated robotic arm to carry out an insertion completion sequence. In some implementations, the insertion completion sequence includes causing an end of the articulated robotic arm to move out of the fabrication machine build space. In some implementations, the insertion completion sequence includes causing an end of the articulated robotic arm to move into a designated space. In some implementations, the insertion completion sequence includes causing an end of the articulated robotic arm to press a button or otherwise complete an electrical link signaling the fabrication machine to resume a build process. In some implementations, the insertion completion sequence includes closing a door attached to the fabrication machine. In some implementations, the control system is not otherwise communicatively coupled to a rapid fabrication machine in the rapid fabrication environment.

In one aspect, the disclosure relates to tangible computer readable media that has instructions recorded thereon, which, when executed by a computer processor, cause the computer processor to perform operations of receiving one or more images of a fabrication machine build space, identifying a hieroglyph present in the one or more images, translating the identified hieroglyph into one or more instructions for manipulation of an articulated robotic arm, and causing the articulated robotic arm to carry out the instructions translated from the identified hieroglyph.

BRIEF DESCRIPTION OF THE DRAWINGS

The above and related objects, features, and advantages of the present disclosure will be more fully understood by reference to the following detailed description, when taken in conjunction with the following figures, wherein.

Like reference numbers and designations in the various drawings indicate like elements.

DETAILED DESCRIPTION

Aspects and implementations of the present disclosure generally relate to systems and methods of using a Hieroglyphic Machine Interface Language (HMIL) for communication with auxiliary robotics in a rapid fabrication environment. Although presented in terms of a stereolithography environment, any form of rapid fabrication may be used, including, for example, fused deposition machines or selective laser sintering machines. As the rapid fabrication system generates an object, one or more auxiliary robots observe the fabrication process and insert foreign objects into the fabrication space. These objects are effectively embedded in the resulting fabricated object. For example, a metal drivetrain could be seamlessly inserted into a fabricated toy car. The auxiliary robots are controlled by the fabrication process itself, which presents visual cues (HMIL symbols) to vision systems used by one or more controllers of the auxiliary robots. In some implementations, the hieroglyphic symbols (hieroglyphs) or instructions for presenting the hieroglyphs are included in a fabrication design file, e.g., a CAD file. A vision system recognizes and interprets the HMIL symbols as instructions for controlling the auxiliary robots.

Figure 1:
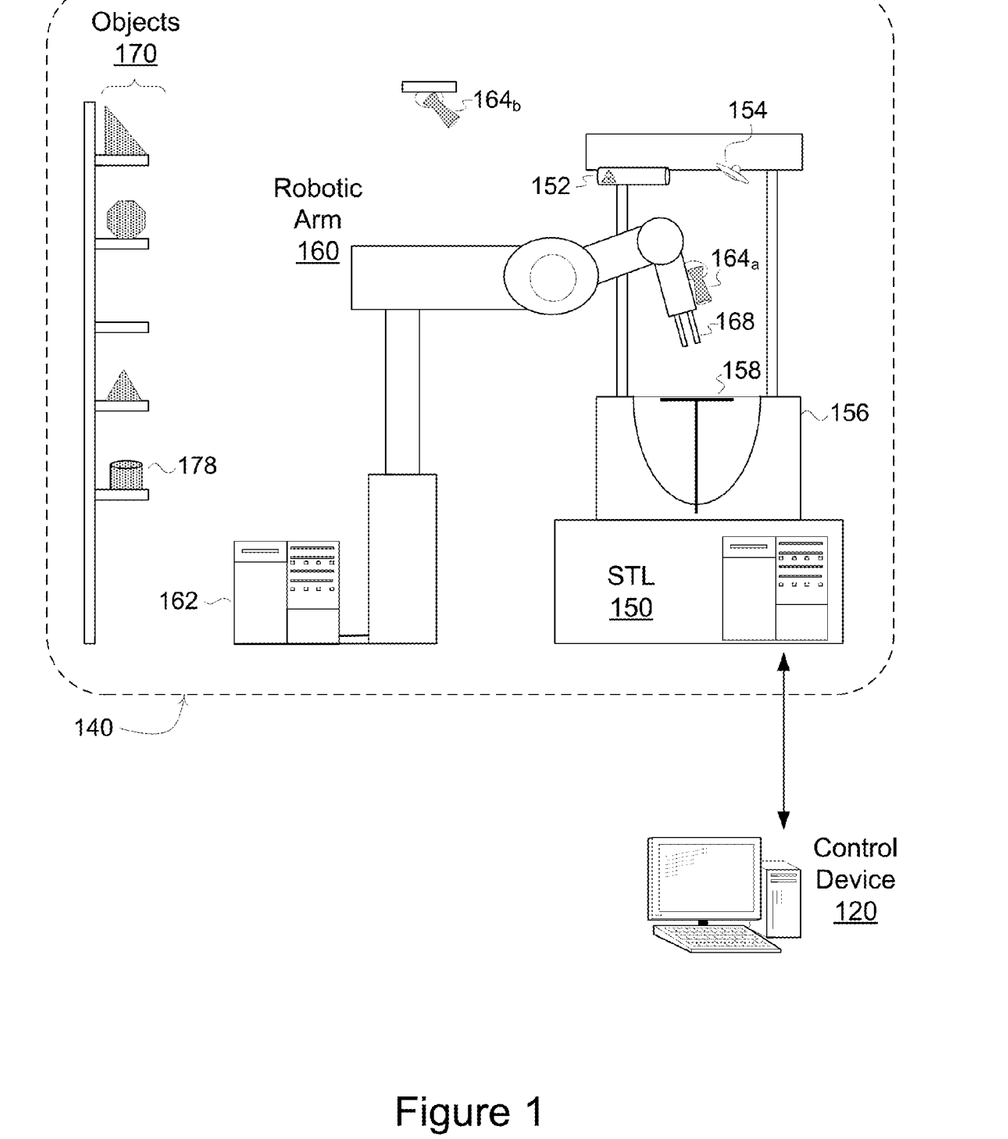
FIG. 1 is a block diagram of an example rapid fabrication environment.

FIG. 1 is a block diagram of an example rapid fabrication environment 140. In broad overview, the rapid fabrication environment 140 includes a stereolithography (STL) rapid fabrication machine 150, a robotic arm 160, and an assortment of objects 170 for insertion during fabrication of an object. The STL 150 includes a laser 152, a beam positioner 154, a base 156, and a build platform 158. The robotic arm 160 includes a control system 162 and an object manipulator 168. A digital imaging system provides the robotic arm 160 with images of the build area in the STL 150, i.e., the space above the build platform 158. The digital imaging system may use a camera $164_a$ attached to the robotic arm 160 or a camera $164_b$ mounted separately in the rapid fabrication environment 140, e.g., inside the fabrication machine 150 itself The digital imaging system is referred to generally herein as a camera 164. In some implementations, multiple cameras 164 are used. The objects 170 are arranged on one or more shelves, usually in assigned locations. In some implementations, the generator 150 is operated by a control device 120, e.g., a computer.

Referring to FIG. 1 in more detail, the STL 150 is an example of a stereolithographic rapid fabrication machine. The illustrated STL 150 includes a laser 152 and a beam positioner 154. The laser 152 projects a laser beam into the beam positioner 154, which then aims the beam at a precise location on the build platform 158. The beam positioner 154 is a mirror, or set of mirrors, mounted in a manner that allows movement for precise aiming of the laser beam projected by the laser 152. In some implementations, the laser beam is in the ultraviolet spectrum. The base 156 of the STL 150 includes a basin filled with liquid photo-reactive resin and the build platform 158. The build platform 158 is a height-adjustable table inside the basin, positioned just below the surface of the resin. The laser beam cures the top layer of the resin in the basin, forming a solid resin on the build platform 158. The platform 158 is then lowered a small amount, e.g., 25 to 100 microns, to allow the liquid resin to again cover the surface and the process is repeated. As the laser cures the resin, an object is generated on the table, one layer of cured resin at a time.

In some implementations, the arrangement of laser and resin is altered so that the fabricated object is generated in an inverted manner, with the object progressively removed from a layer of liquid resin as it is formed. In some implementations, a powder material is used instead of a liquid resin; this is typically referred to as selective sintering. An alternative to stereolithography or selective sintering is a fused deposition or fused filament machine. Fused deposition relies on an extruder to deposit material (e.g., a plastic filament heated to a melting point) in precise locations on a build platform, building up an object from droplets of the material. As layers are formed, either the extruder height is adjusted upwards, or the platform is incrementally lowered from the extruder.

Although a stereolithography machine 150 is illustrated in FIG. 1, any type of rapid fabrication with adequate resolution can be used, including, for example, fused deposition machines or selective laser sintering machines.

In some implementations, the STL 150 is surrounded by protective walls forming a chamber. In some implementations, the chamber has a door, and the STL 150 can determine if the chamber door is open or closed. In some implementations, the STL 150 is controlled by a separate control device 120, e.g., a computing system. The control device 120 may be in the rapid fabrication environment 140, or may be remote from the environment 140 and connected by, for example, a data network.

The robotic arm 160 includes a control system 162 and an object manipulator 168. The robotic arm 160 is articulated, i.e., it has one or more joints able to rotate or move along an axis. These articulation joints allow the control system 162 to adjust the robotic arm 160 and precisely position the object manipulator 168 at the end thereof. The object manipulator 168 is able to grab and release objects 170. For example, in some implementations, the object manipulator 168 is a set of moveable prongs that can open or close like a hand. The control system 162 moves the object manipulator 168 to an object 170, uses the object manipulator 168 to grab the object 170, moves the object manipulator 168 holding the object 170 to another position, and causes the object manipulator 168 to release the object 170. In some implementations, the robotic arm 160 is mounted on a mobile base. In some implementations, the robotic arm 160 is completely autonomous from the STL 150.

The control system 162 uses a digital imaging system camera 164 to obtain images of the fabrication environment 140. The digital camera 164 uses an imaging sensor, e.g., a CCD or CMOS chip, to generate a digital image. In some implementations, the imaging sensor can detect light in the visible spectrum. In some implementations, the imaging sensor can detect light in the ultraviolet spectrum. In some implementations, the imaging sensor can detect light in the infrared spectrum. In some implementations, the digital camera 164 includes one or more lenses arranged to focus light into an image on the imaging sensor. In some implementations, a motor is attached to one or more of the lenses to move them along the focal path and adjust the focus of the image on the imaging sensor. In some implementations, the camera 164 includes an adjustable iris and/or a physical shutter in the focal path. The camera captures images from the imaging sensor. In some implementations, the images are captured at a regular interval, i.e., at a frame rate.

The images are analyzed by an image recognition process executed, e.g., by the control system 162 for the robotic arm 160. In some implementations, the camera 164 is wired directly to the control system 162. For example, a camera $164_a$ may be integrated into the robotic arm. In some implementations, the camera 164 is part of an autonomous system in communication with the control system 162, e.g., via a wireless data network. The control system 162 analyzes the images in order to recognize hieroglyphs, e.g., as described in reference to FIG. 5.

The objects 170 are arranged on one or more shelves. In some implementations, a vision system uses a camera 164 to identify specific objects 170. In some implementations, the robotic arm control system 162 relies on having a particular object 170 at a predetermined, assigned, location. When the control system 162 determines that it is to insert an object 170 into the build space of the fabrication system 150, it uses the object manipulator 168 to grasp the correct object 170 and uses the articulated robotic arm 160 to position the object 170 at a precise location.

Figure 2:
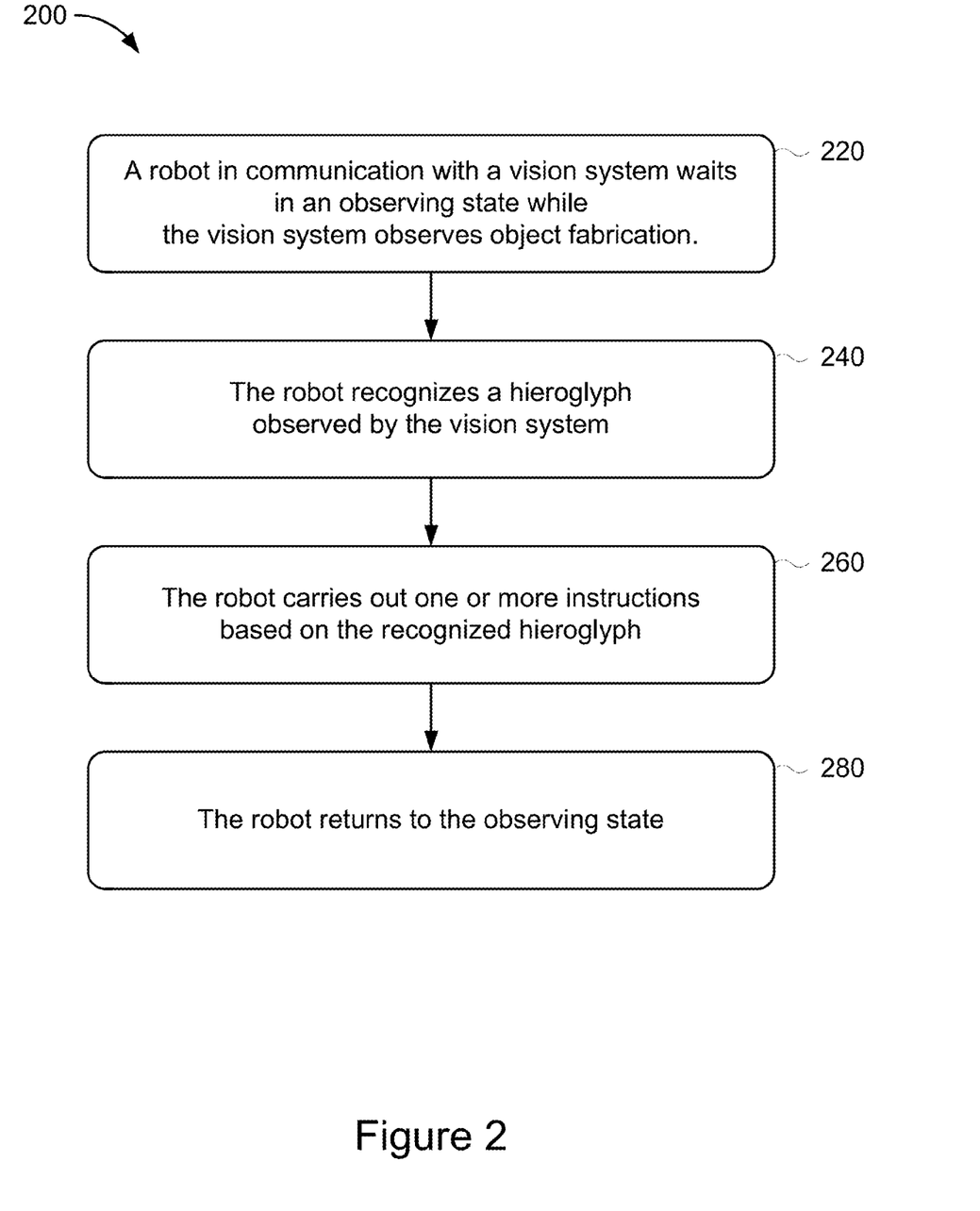
FIG. 2 is a flowchart for a method of controlling a robot in response to recognition of hieroglyphs.
Figure 3A:
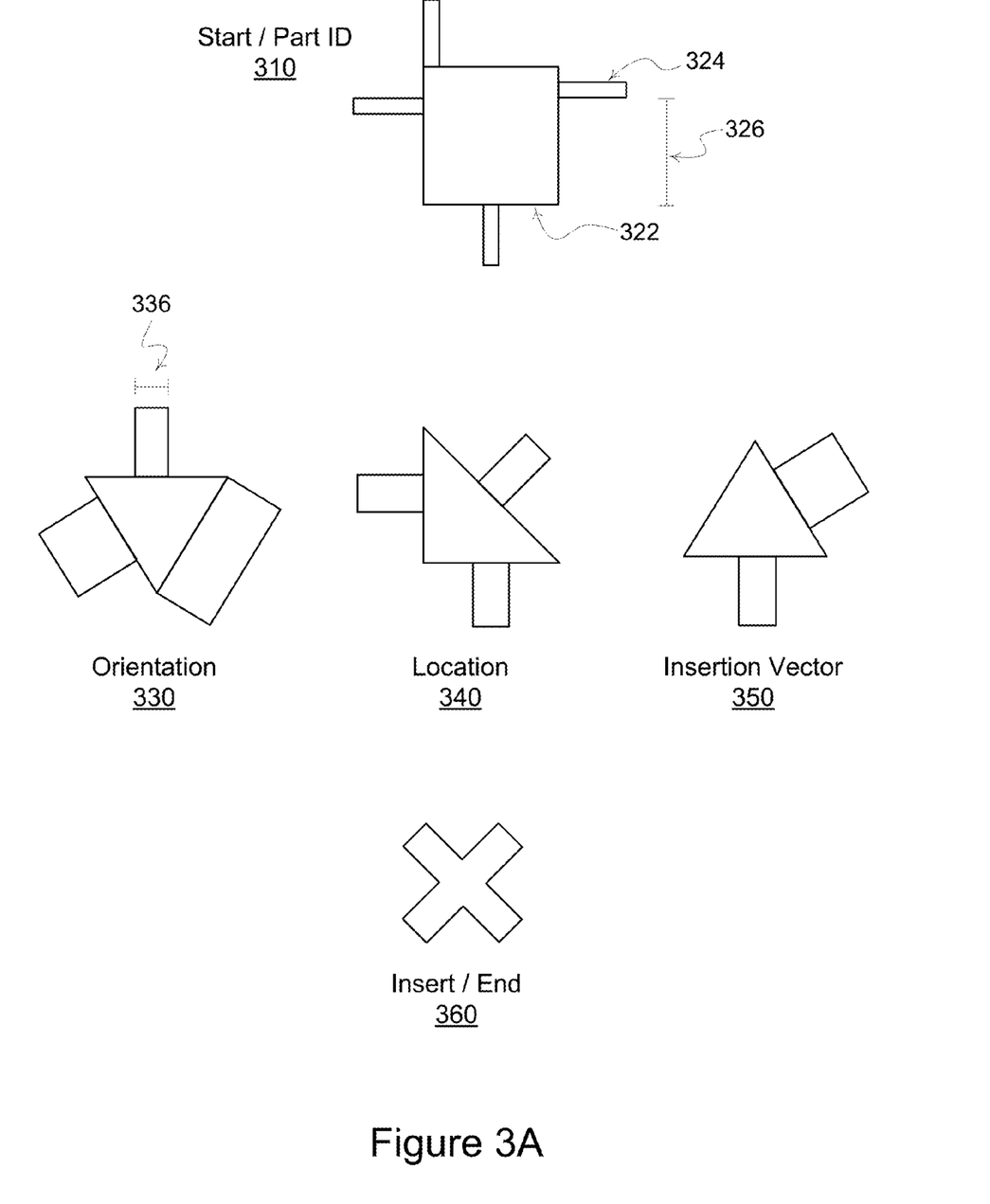
FIG. 3A is an illustration of example hieroglyphs for a Hieroglyphic Machine Interface Language.

FIG. 2 is a flowchart for a method 200 of controlling a robot in response to recognition of hieroglyphs. In broad overview, a robot in communication with a vision system waits in an observing state while the vision system observes object fabrication (stage 220). The robot recognizes a hieroglyph observed by the vision system (stage 240) and carries out one or more instructions based on the recognized hieroglyph (stage 260). The robot then returns to the observing state (stage 280). The robot, e.g., the robotic arm 160 illustrated in FIG. 1, is thus controlled by the observed hieroglyphic symbols. FIG. 3A is an illustration of a set of example hieroglyphs for a Hieroglyphic Machine Interface Language (HMIL). In some implementations, other sets of hieroglyphic symbols are used.

Figure 5:
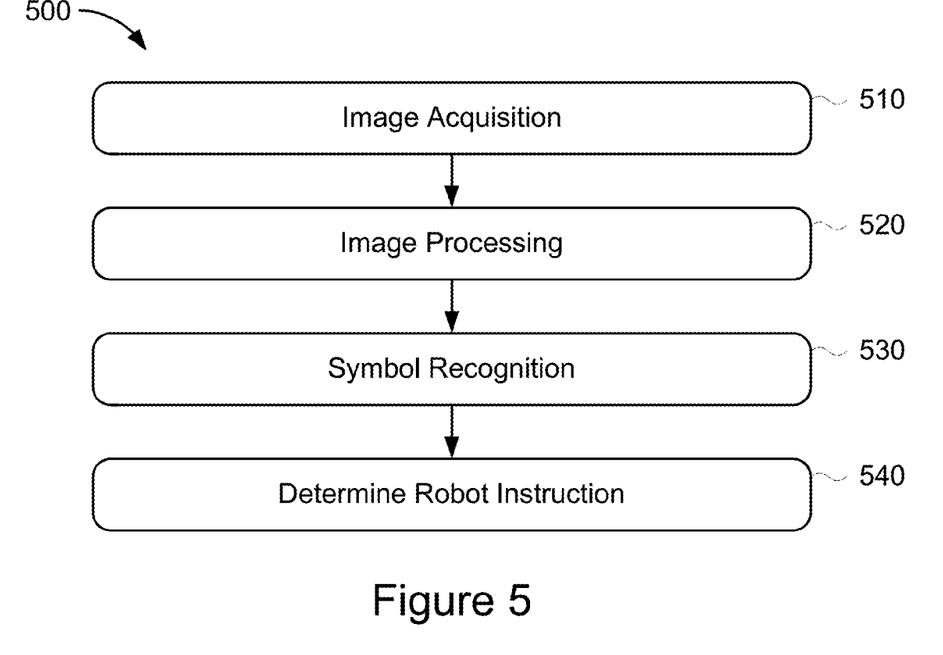
FIG. 5 is a flowchart for a method of recognizing hieroglyphs.

Referring to FIG. 2 in more detail, a robot in communication with a vision system waits in an observing state while the vision system observes object fabrication (stage 220). For example, the robot may be the robotic arm 160 illustrated in FIG. 1, controlled by a controller 162, and in communication with a camera 164. The observing state is a physical location or region where the articulated arm 160 waits until it has instructions. The camera 164 observes a surface or space while the vision system looks for hieroglyphic symbols. Recognition of hieroglyphs is discussed further in reference to FIG. 5. In some implementations, a rapid fabrication machine, e.g., the stereolithography machine 150 illustrated in FIG. 1, fabricates an object with a hieroglyph embedded in, or printed on, a surface of the object being fabricated. In some implementations, the fabrication is driven by an instruction set (e.g., a CAD file) and the rapid fabrication machine is configured to pause after fabricating or printing one or more hieroglyphs. For example, in some implementations, the rapid fabrication machine 150 creates a top surface on the fabricated object with a hieroglyph visibly embossed in the surface. After a brief period sufficiently long for the vision system camera 164 to see detect the hieroglyph, the fabrication machine 150 fills in the surface or creates a new top surface, which may have one or more additional symbols. In some implementations, the rapid fabrication machine uses a laser to trace out the shape of a hieroglyph as part of the fabrication process, such that the hieroglyph is not visible on the surface of the object being fabricated, but can still be observed by the camera 164. For example, in some implementations, the camera 164 tracks the incidence of the laser beam on the build surface, or in a designated area of the rapid fabrication machine 150. The vision system tracks the incidence of the laser beam through multiple image frames captured by the camera 164 and aggregates the frames to construct a single image containing the hieroglyphic pattern or symbol. The symbol is then analyzed and interpreted. In some implementations, the rapid fabrication machine includes a separate projector that projects an image of hieroglyphs on the rapid fabrication machine base 156 or build surface 158. Any method can be used to cause display of the hieroglyphs for observation by the vision system. FIG. 5 is a flowchart for a method of recognizing hieroglyphs.

The robot recognizes a hieroglyph observed by the vision system (stage 240). The recognized hieroglyph is a symbol in an HMIL vocabulary. For example, the symbol may notify the robot that a foreign object 170 needs to be inserted into the fabricated object, the symbol may identify a specific object 170 to insert, and/or the symbol may provide specific insertion details such as the orientation of the object, the location where it should be inserted, and an approach vector for the insertion. In some implementations, a terminal symbol notifies the robot that an instruction sequence is complete and that the robot should insert the foreign object 170. In some implementations, the rapid fabrication machine waits until insertion is complete. In some implementations, the instruction file (e.g., a CAD file) includes a sufficient time to wait for insertion to complete. In some implementations, the rapid fabrication machine waits for the robot to signal insertion completion. In some implementations, the rapid fabrication resumes fabrication after the robotic arm has left the build area or after a chamber door has been closed.

The robot converts the recognized hieroglyphs into an instruction set and carries out one or more instructions based on the recognized hieroglyph (stage 260). The robot controller 162 may determine that the hieroglyphs specified a particular object 170 and determine how to move the manipulator 168 into position to grip or pick-up the object 170. The robot controller 162 then adjusts the articulation points of the robotic arm 160 and picks up the object 170. In some implementations, prior to picking up an object 170, the robotic arm opens a chamber door for the rapid fabrication machine. In some implementations, an open door causes the rapid fabrication machine to pause fabrication. The robot controller 162 then inserts the picked-up object 170 into the build space and releases it at the location specified by the recognized hieroglyphs.

The robot then returns to the observing state (stage 280). In some implementations, the robotic arm closes a chamber door for the rapid fabrication machine after inserting an object. In some implementations, a closed door causes the rapid fabrication machine to resume fabrication. If fabrication continues, the method 200 is repeated from stage 220.

Figure 3B:
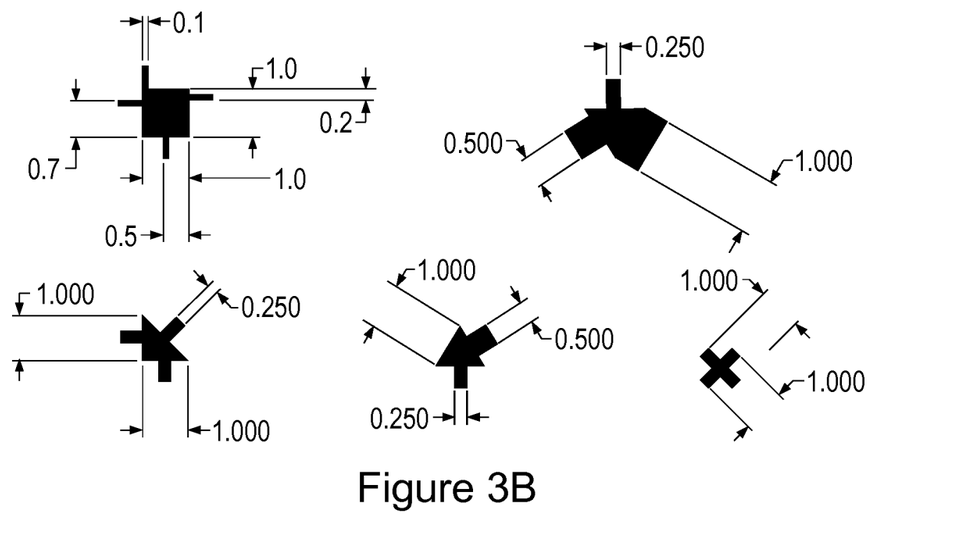
FIG. 3B is an illustration of relative dimension measurements for the hieroglyphs shown in FIG. 3A.
Figure 3C:
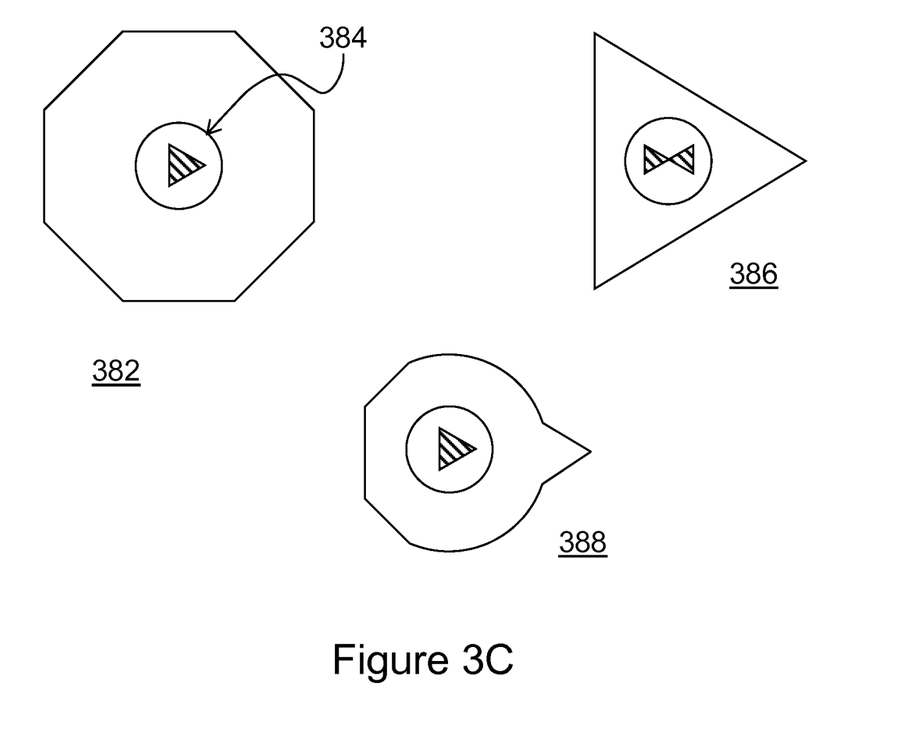
FIG. 3C is an illustration of additional symbols that could be used to form a vocabulary of hieroglyphs.

FIG. 3A is an illustration of example hieroglyphs for a Hieroglyphic Machine Interface Language (HMIL). Five distinct hieroglyphs are shown, a start/part ID hieroglyph 310, an orientation hieroglyph 330, a location hieroglyph 340, an insertion vector hieroglyph 350, and an insertion/end hieroglyph 360. Any well-defined set of symbols may be used to form an HMIL. For example, an alternative set of hieroglyphs is illustrated in FIG. 3C.

Referring still to FIG. 3A, each of the hieroglyphs 310, 330, 340, and 350, are formed from a base shape and additional rectangular tabs. The positioning of the tabs provides additional information about the meaning of the hieroglyph. For example, the start/part ID hieroglyph 310 has a rectangular base 322 and four tabs 324, one on each side of the base 322. The position of each tab 324, e.g., its distance 326 from respective edges of the base symbol 322, indicates a numeric value. In some implementations, each of the tabs 324 can be positioned in one of ten distinct locations along the respective edge of the base symbol 233. Each position represents a decimal digit, 0-9. Thus there are 10,000 permutations of the start/part ID hieroglyph 310, with each permutation specifying a different object 170 for insertion.

The orientation symbol 330 indicates specific pitch, roll, and/or yaw angels. In some implementations, the orientation symbol 330 is a triangular base symbol with tabs on each side of the triangular base. The position and/or width 336 of a tab indicates a value. In some implementations, the values are degrees of rotation along a particular axis. For example, in some implementations, the orientation symbol 330 is an equilateral triangle pointing in a downward direction relative to the vision system, or to a fixed point in a build space. The tab on the edge furthest from the "point," e.g., the tab at the top edge of the triangle, signifies a pitch angle for the object to be inserted. The lower right rectangle signifies a roll angle and the final rectangle signifies a yaw angle. The width 136 of the tab rectangles, relative to their respective sides of the triangle, are associated with an angle. For example, if the tab rectangle is half the width of its respective side, this would indicate a 180 degree rotation. No tab on an edge indicates 0 degrees. FIG. 3B illustrates example relative measurements of hieroglyph base symbols and tabs.

The location symbol 340 indicates where the object should be placed. In some implementations, the location symbol 340 has a right triangle as a base with tabs on each side of the triangular base. The tab on the hypotenuse of the right triangle indicates a depth into the surface (i.e., a z axis coordinate). The tabs on the other two edges of the right triangle indicate, respectively, x and y axis coordinates. In some implementations, the coordinates are relative to a fixed Cartesian grid for the build space. In some implementations, the coordinates are relative to the position of the hieroglyph itself For example, using the point of the ninety degree angle as the origin, a tab that is two units wide (e.g., 2 millimeters wide) indicates a distance of two (or two times a multiplier) units displaced from the origin along the indicated axis. FIG. 3B illustrates example relative measurements of hieroglyph base symbols and tabs.

The insertion vector symbol 350 is a triangular base symbol with tabs on each side of the triangular base to indicate specific pitch, roll, and/or yaw angels, similar to the orientation symbol 330. In some implementations, the insertion vector symbol 350 only indicates pitch and yaw, and relies on the orientation symbol 330 to indicate roll. The insertion vector is the angle at which the robotic arm should enter the build area.

In some implementations, the insertion vector is chosen to avoid shadowing the laser. In some implementations, the insertion vector symbol 350 is pointed in the opposite direction as the orientation symbol 330. For example, in some implementations, the insertion vector symbol 350 is an equilateral triangle pointing in an upward direction relative to the vision system, or away from a fixed point in a build space. Like the orientation symbol 330, the width of the tab rectangles on the insertion vector symbol 350, relative to their respective sides of the triangle, are associated with an angle. For example, if the tab rectangle is half the width of its respective side, this would indicate a 180 degree rotation. No tab on an edge indicates 0 degrees. FIG. 3B illustrates example relative measurements of hieroglyph base symbols and tabs.

The insert/end symbol 360 indicates to the robot 160 that an instruction sequence is complete and that the robot should insert an object 170 as specified. In some implementations, each hieroglyphic symbol is rendered or presented for the robot and then replaced with a smooth surface or another hieroglyphic symbol. The insert/end symbol 360 is the last symbol for such a sequence.

FIGS. 3B is an illustration of relative dimension measurements for the hieroglyphs shown in FIG. 3A. In some implementations, the base symbols are rendered with fixed-length sides, e.g., 1 inch or 1.4 inches. The tabs on the edges are rendered with either a fixed width, e.g., a tenth of an inch for tabs on the start hieroglyph 310, or with a width relative to the base symbol side, e.g., a quarter inch to represent 25% or 90 degrees. The dimensions shown in FIG. 3B are merely illustrative and are not meant to be limiting. In some implementations, larger symbols are used. For example, if the resolution of the fabrication machine cannot render visible symbols at a smaller unit size. In some implementations, the overall size of the symbol is also used to convey information to the robot 160. For example, the hieroglyphs in FIG. 3C use the size of the shapes to indicate which object 170 to insert and where.

FIG. 3C is a non-limiting illustration of other symbols that could be used to form a vocabulary of hieroglyphs. For example, an octagon 382 with a triangle 384 placed in the center can be used. The size of the octagon 382 can be measured, e.g., relative to the triangle 384, and used to identify which foreign object 170 to insert. The direction of the arrow 384 can be used to indicate a location. In some implementations, multiple symbols are shown on the build surface pointing to a central insert location. In some implementations, the vision system triangulates the placement of multiple symbols to identify the exact insert location. In some implementations, a smaller embedded symbol, e.g., the middle of an hourglass or triangle 384, is used for precise triangulation. In some implementations, a triangle 386 is used as a separate hieroglyph, e.g., with a bar or hourglass symbol in the middle for orientation. Rotation of the symbol in place can be used to convey information. For example, the triangle 386 may initially point towards a desired axis for insertion and then rotated sixty degrees to instruct the robot to insert the object.

Any shape, or combination of shapes, could be used. For example, a teardrop 388 could be used with various edges and surfaces that each can be modified to convey specific information. Any combination of the symbols described could be used. For example, the tabs described in reference to FIG. 3A could be used with the teardrop 388 shown in FIG. 3C.

Figure 4:
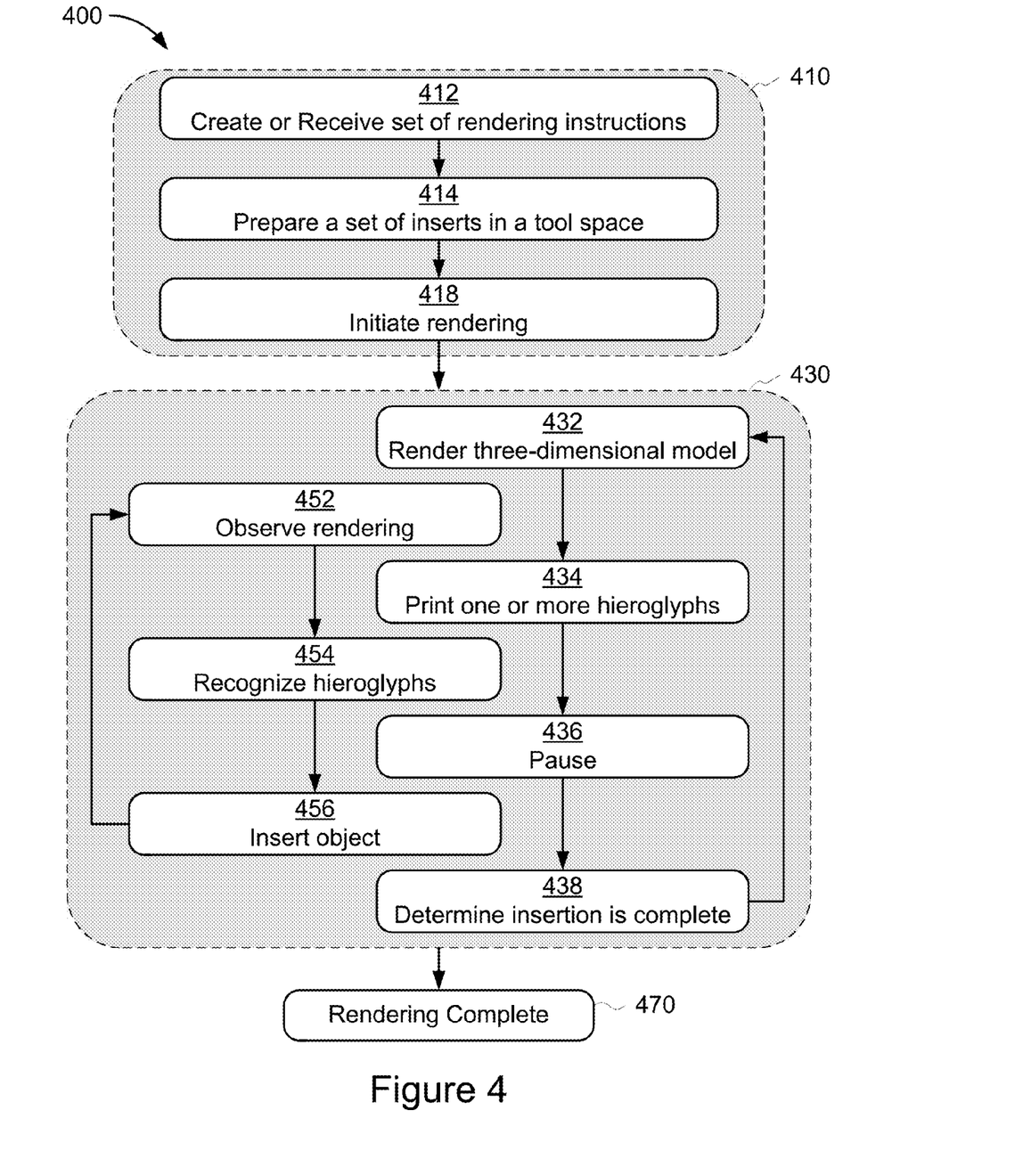
FIG. 4 is a flowchart for a method of inserting objects into a rapid fabrication environment based on hieroglyphs.

FIG. 4 is a flowchart for a method 400 for inserting objects into a rapid fabrication environment based on the hieroglyphs. In broad overview, in an initial stage 410, an instruction file (e.g., a CAD file) is received by the rapid fabrication machine 150 (stage 412), a set of insert objects 170 are prepared in a tool space (stage 414), and the rapid fabrication machine is instructed to initiate a rendering process to fabricate an object (stage 418). During a fabrication stage 430, the fabrication machine 150 renders a three-dimensional object (stage 432), occasionally displays one or more hieroglyphs (stage 434), waits for the foreign objects to be inserted into the build space in response to the hieroglyphs (stage 436), and determines insertion is complete (stage 438) before resuming rendering (stage 432). Likewise, during the fabrication stage 430, a robot 160 use a vision system to observe the rendering process (stage 452), recognizes the displayed hieroglyphs (stage 454), and inserts objects in accordance with the recognized hieroglyphs (stage 456). When the rapid fabrication machine is done, rendering is complete (stage 470).

Referring to FIG. 4 in more detail, at an initial stage 410, an instruction file is received by the rapid fabrication machine 150 (stage 412), a set of insert objects 170 are prepared in a tool space (stage 414), and the rapid fabrication machine is instructed to initiate a rendering process to fabricate an object (stage 418).

The instruction file (e.g., a CAD file) is received by the rapid fabrication machine 150 (stage 412). For example, an administrator of rapid fabrication machine operator may supply the instruction file. In some implementations, the instruction file is created using the fabrication machine. In some implementations, the instruction file is fetched from a data server via a network.

The set of insert objects 170 are prepared in a tool space (stage 414). In some implementations, each object 170 that may be inserted into a fabricated object is placed a specific location such that identification of a source location is synonymous with identification of an object. In some implementations, the robotic arm controller is configured to use a vision system to recognize objects. In some implementations, the robotic arm controller is configured to place objects in a tool space. In some implantations, placement is done manually. In some implementations, objects are placed in the tool space during the fabrication stage 430. For example, an object may be fabricated, moved to the tool space, and then reinserted at a later time during the fabrication process.

The rapid fabrication machine is then instructed to initiate a rendering process to fabricate an object (stage 418). The robotic arm is in a ready position, waiting for instructions to insert objects into the build area of the fabrication machine. The camera 164 is positioned to view the build space and capture images of hieroglyphs created during the fabrication or rendering process.

Still referring to FIG. 4 in detail, during a fabrication stage 430, the fabrication machine 150 renders a three-dimensional object (stage 432), occasionally displays one or more hieroglyphs (stage 434), waits for the foreign objects to be inserted into the build space in response to the hieroglyphs (stage 436), and determines insertion is complete (stage 438) before resuming rendering (stage 432). Likewise, during the fabrication stage 430, a robot 160 use a vision system to observe the rendering process (stage 452), recognizes the displayed hieroglyphs (stage 454), and inserts objects in accordance with the recognized hieroglyphs (stage 456).

The fabrication machine 150 renders the three-dimensional object (stage 432) using the method or process associated with the particular type of fabrication machine used. For example, if the fabrication machine 150 employs stereolithography, a laser is projected into the build area to cure a resin. As the laser is projected onto the resin in the build area, the instructions in the CAD file cause it to occasionally display one or more hieroglyphs (stage 434). In some implementations, the hieroglyphs are physically formed in the surface of the item being fabricated. In some implementations, the camera tracks the incidence of the laser beam through multiple images frames and the frames can be aggregated to construct a single image containing an image of a hieroglyph traced by the glow of the incident laser beam. That is, the laser is projected onto the resin in the build area, or onto a surface proximate to the build area, where the laser traces out an image of the hieroglyph without fully forming the symbols in the resin. In some implementations, the fabrication machine presents multiple hieroglyphs at stage 434.

The fabrication machine then waits for a foreign object to be inserted into the build space in response to the hieroglyphs (stage 436). In some implementations, the instruction file specifically indicates that the fabrication machine should pause for a specific length of time or until a separate resume signal is received by the fabrication machine. In some implementations, the instruction file indicates a holding period during fabrication, where the holding period is sufficiently long to accommodate object insertion.

The fabrication machine determines insertion is complete (stage 438) before resuming rendering (stage 432). To determine that insertion is complete, in some implementations, the fabrication machine waits for an indicator that insertion is complete. In some implementations, the indicator is that the robotic arm has left the build space. In some implementations, the indicator is that a door to a chamber surrounding the build space has been closed (e.g., by the robotic arm). In some implementations, the robotic arm presses a button or completes a circuit to generate a resume signal for the fabrication machine. In some implementations, the fabrication machine simply waits a predetermined length of time sufficient for object insertion and then resumes.

During the fabrication stage 430, a robot 160 uses a vision system to observe the rendering process (stage 452), recognizes the displayed hieroglyphs (stage 454), and inserts objects in accordance with the recognized hieroglyphs (stage 456). These stages are similar to those described in reference to FIG. 6. They are shown in FIG. 4 interleaved with the stages of rapid fabrication performed by the fabrication machine 150.

When the rapid fabrication machine is done, rendering is complete (stage 470).

FIG. 5 is a flowchart for a method 500 of recognizing hieroglyphs. In broad overview, a vision system acquires an image (stage 510). The acquired image is processed (stage 520) and a symbol is recognized (stage 530) by the vision system. The vision system, or a control system for the robot, then determines one or more robot instructions from the recognized symbol (stage 540).

Referring to FIG. 5 in more detail, the method 500 begins with image acquisition by a vision system (stage 510). The vision system may include a camera, e.g., the camera 164 illustrated in FIG. 1. The vision system acquires one or more images from the camera, where each image is of the build area for rapid fabrication machine, e.g., the STL 150 illustrated in FIG. 1. In some implementations, the images are of a specific area within the build area, e.g., a space on the build table or a space proximate to the build table. In some implementations, the image acquired at stage 510 is a composite of multiple images from the camera. For example, in some implementations, the camera captures images at a frame rate sufficiently fast to track the movement of a laser beam across the build surface or the resulting glow of the beam incidence on the surface. In some implementations, the frame rate is 100 Hz. The beam traces out a symbol, which appears when the images are blended together. In some implementations, the image is of a surface of a three-dimensional object as it is fabricated by the rapid fabrication machine. In some implementations, additional lighting is used to improve contrast of the hieroglyph edges against the surrounding material.

The image system processes the acquired image (stage 520). The acquired image is processed to simplify symbol recognition. For example, in some implementations, the image is converted from a captured color-space into a black and white image, e.g., by thresholding such that each pixel is represented by a single bit (1 or 0) indicating dark or light. In some implementations, the images are filtered to reduce image noise. For example, some fabrication machines build supports in or around the hieroglyphs. A filter can remove the extraneous noise of these support structures. In some implementations, the image is thinned using a distance transform reducing the hieroglyphs to a narrow width, e.g., a single pixel width.

The image system recognizes a symbol from the processed acquired image (stage 530). Any form of image or pattern recognition can be used to recognize a symbol in the processed image. For example, in some implementations, a template matching via cross correlation strategy is used. Once the type of symbol is determined, the features of the symbol are measured. Features include, for example, a base symbol and surrounding additional symbols, e.g., the tabs illustrated in FIG. 3A. FIG. 3B illustrates examples of such measurements.

The vision system, or a control system for the robot, then determines one or more robot instructions from the recognized symbol (stage 540). The symbol recognized in stage 530 translates to a routine, or is part of a cluster of symbols that translate to a routine. The routine may be, for example, selection of a particular object for insertion into the build space, positioning of the object, or the destination location and approach vector for inserting the object into the build space. At stage 540, the recognized symbol is translated into a routine or a set of instructions for performing the routine. In some implementations, measurements of the symbol, or of features of the symbol, provide parameters for the routine or instructions. For example, if additional symbols around a base symbol are measured to be a particular size in relation to the base symbol, then the instructions are modified in a predetermined manner according to the ration of sizes. In some implementations, the hieroglyphs are part of a series of hieroglyphs and the control system buffers a set of instructions until a hieroglyph is encountered that authorizes execution of the buffered set of instructions. For example, the system may recognize a begin insertion instruction, or an end of instruction sequence indicator, or any other terminating hieroglyph. For example, the insert/end symbol 360 illustrated in FIG. 3A can be a terminating hieroglyph.

Figure 6:
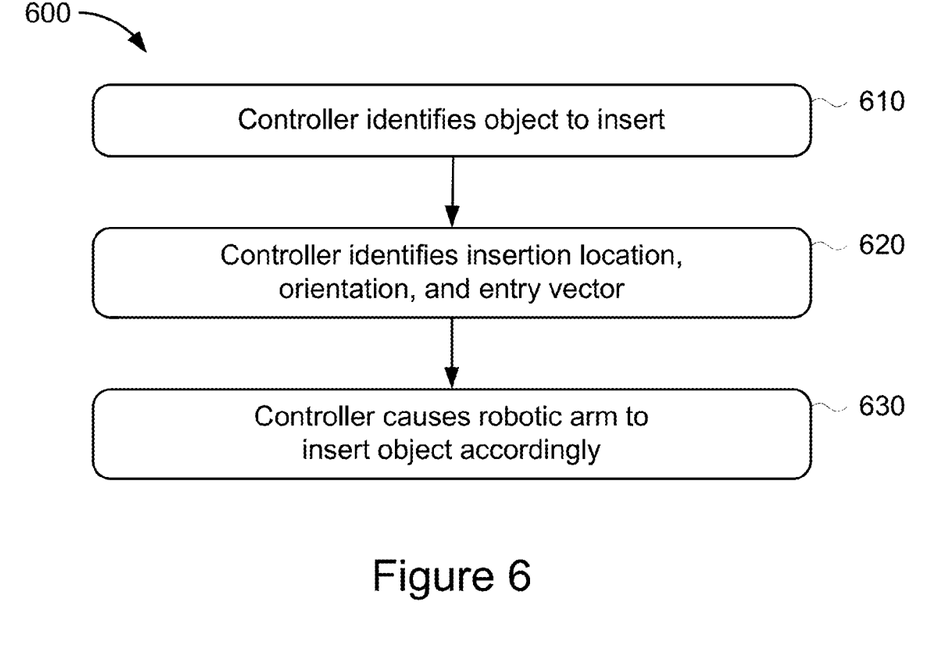
FIG. 6 is a flowchart for a method of carrying out an instruction based on a set of hieroglyphs.

FIG. 6 is a flowchart for a method 600 of carrying out an instruction based on a set of hieroglyphs. A robot controller interprets hieroglyphs to identify an object to insert (stage 610). The robot controller also interprets hieroglyphs to identify an insert location, object orientation, and an entry vector for insertion of the object (stage 620). The robot controller then inserts the object accordingly (stage 630).

Referring to FIG. 6 in more detail, the method 600 begins with a control system identifying an object to insert (stage 610). For example, the control system may identify a hieroglyph using the method 500 illustrated in FIG. 5, and the identified hieroglyph may identify a particular object for insertion, e.g., the identified hieroglyph may be the start/part ID symbol 310 illustrated in FIG. 3A.

The control system also identifies an insert location, object orientation, and an entry vector for insertion of the object (stage 620). For example, the control system may identify one or more additional hieroglyphs using the method 500 illustrated in FIG. 5, and the identified hieroglyphs may identify an insert location, object orientation, or an entry vector. For example, an identified hieroglyph may be one of the orientation symbols 330, location symbols 340, or insertion vector symbols 350 illustrated in FIG. 3A.

The control system then causes the identified object to be inserted at the identified insert location, with the object orientated according to the identified object orientation and inserted along the identified entry vector (stage 630). That is, control system instructs an articulated robotic arm with an object manipulator end to move the object manipulator end to an identified object, pick it up, rotate it into an orientation, and place it in the build area at a determined location along a particular approach vector. Each of these movements of the arm are precisely controlled based on the recognized hieroglyphic symbols. As a result, images created during the build process of a rapid fabrication machine simultaneously cause an independent robotic arm to insert foreign objects into the build space.

The articulated robotic arm, vision systems, and rapid fabrication machines described are mechanical devices controlled by computing systems. In some implementations, each of these systems is antonymous. For example, in some implementations, the fabrication machine is completely independent from the robotic arm.

Figure 7:
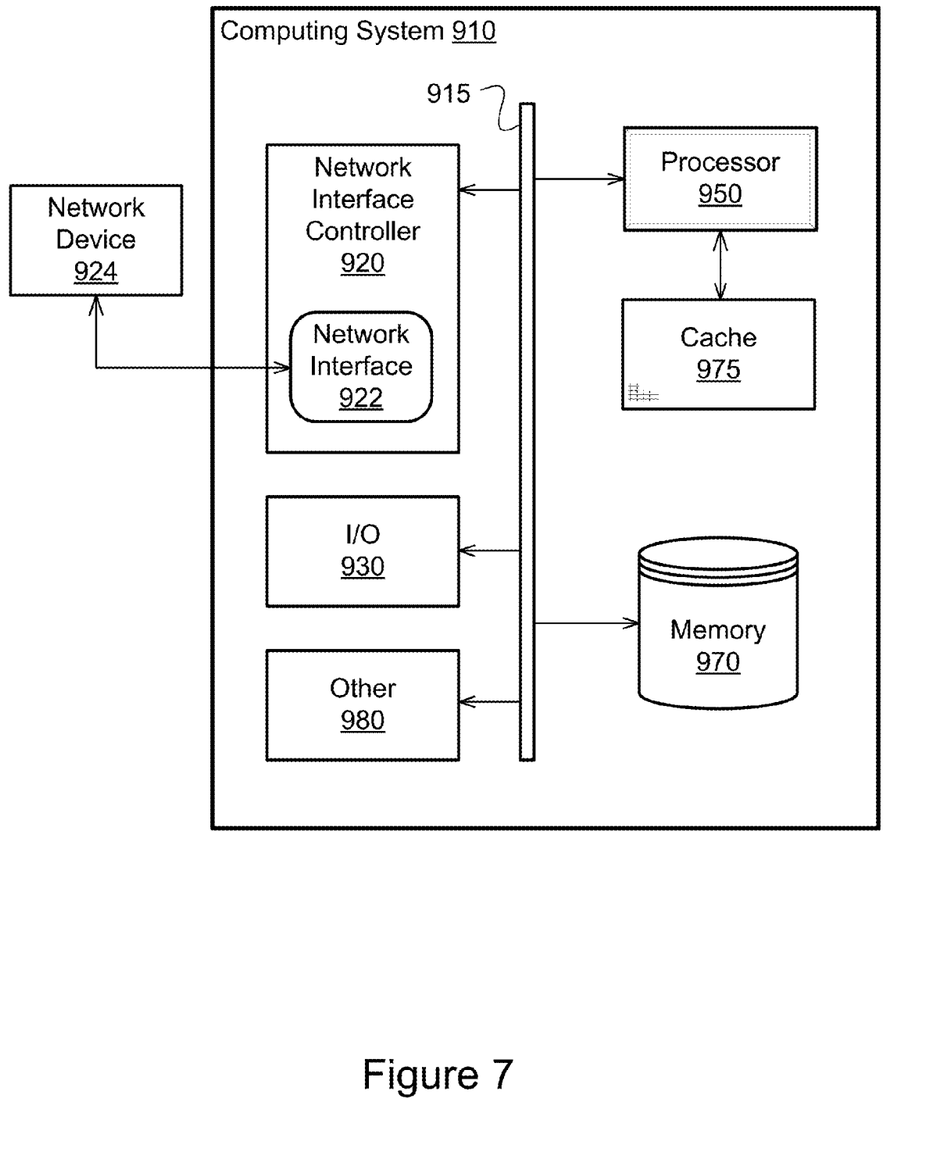
FIG. 7 is a block diagram of a computing system in accordance with an illustrative implementation.

FIG. 7 is a block diagram of a computing system 910 suitable for use in implementing the computerized components described herein. In broad overview, the computing system includes at least one processor 950 for performing actions in accordance with instructions and one or more memory devices 970 or 975 for storing instructions and data. The illustrated example computing system 910 includes one or more processors 950 in communication, via a bus 915, with memory 970 and with at least one network interface controller 920 with a network interface 922 for connecting to external network devices 924, e.g., participating in a network 110. The one or more processors 950 are also in communication, via the bus 915, with any I/O devices at one or more I/O interfaces 930, and any other devices 980. Generally, a processor 950 will execute instructions received from memory. The processor 950 illustrated incorporates, or is directly connected to, cache memory 975.

In some uses, additional other components 980 are in communication with the computer system 910, e.g., external devices connected via a universal serial bus (USB). In some uses, such as in a server context, there is no I/O interface 930 or the I/O interface 930 is not used. In some uses, the I/O interface 930 supports an input device and/or an output device (not shown). In some uses, the input device and the output device are integrated into the same hardware, e.g., as in a touch screen.

In more detail, the processor 950 may be any logic circuitry that processes instructions, e.g., instructions fetched from the memory 970 or cache 975. In many implementations, the processor 950 is a microprocessor unit or special purpose processor. The computing device 910 may be based on any processor, or set of processors, capable of operating as described herein. The processor 950 may be a single core or multi-core processor. The processor 950 may be multiple processors.

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing system 910 may have any number of memory devices 970.

The cache memory 975 is generally a form of computer memory placed in close proximity to the processor 950 for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interface 922. The network interface controller 920 handles the physical and data link layers of the OSI model for network communication. In some implementations, some of the network interface controller's tasks are handled by the processor 950. In some implementations, the network interface controller 920 is part of the processor 950. In some implementations, a computing system 910 has multiple network interface controllers 920. In some implementations, the network interface 922 is a connection point for a physical network link, e.g., an RJ 45 connector. In some implementations, the network interface controller 920 supports wireless network connections and an interface port 922 is a wireless receiver/transmitter. Generally, a computing device 910 exchanges data with other computing devices 924 via physical or wireless links to a network interface 922. In some implementations, the network interface controller 920 implements a network protocol such as Ethernet.

The other computing devices 924 are connected to the computing device 910 via a network interface port 922. The other computing device 924 may be a peer computing device, a network device, or any other computing device with network functionality. For example, a computing device 924 may be a network device such as a hub, a bridge, a switch, or a router, connecting the computing device 910 to a data network such as the Internet.

The other devices 980 may include an I/O interface 930, external serial device ports, and any additional co-processors. For example, a computing system 910 may include an interface (e.g., a universal serial bus (USB) interface) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 910, e.g., a touch screen on a tablet device. In some implementations, a computing device 910 includes an additional device 980 such as a co-processor, e.g., a math co-processor can assist the processor 950 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

Having described certain implementations, it will now become apparent to one of skill in the art that other implementations incorporating the concepts of the disclosure may be used. Therefore, the disclosure should not be limited to certain implementations, but rather should be limited only by the spirit and scope of the following claims.

What is claimed is:

1. A method of using hieroglyphs for communication in a rapid fabrication environment, the method comprising:
   receiving, by a control system for an articulated robotic arm, images of a build space for a fabrication machine;
   identifying, by the control system, a plurality of hieroglyphs present in the images, the plurality of hieroglyphs including at least a first hieroglyph and a second hieroglyph generated by the fabrication machine, wherein the control system identifies the first hieroglyph prior to the fabrication machine generating the second hieroglyph;
   translating, by the control system, the identified plurality of hieroglyphs into one or more instructions for manipulation of the articulated robotic arm; and
   causing, by the control system, the articulated robotic arm to carry out the instructions translated from the identified plurality of hieroglyphs.

2. The method of claim 1, comprising receiving the one or more images from a digital camera, wherein the digital camera is configured to obtain the one or more images of the fabrication machine build space at a predetermined frame rate that is at least as fast as a laser beam movement rate used by the fabrication machine.

3. The method of claim 1, comprising identifying the plurality of hieroglyphs based on a vocabulary for a Hieroglyphic Machine Interface Language.

4. The method of claim 1, wherein the second hieroglyph comprises a base symbol and one or more additional modifier symbols, the method further comprising identifying an operation corresponding to the base symbol and identifying parameters for the operation indicated by one or more values associated with the one or more additional modifier symbols.

5. The method of claim 1, further comprising classifying each of the identified hieroglyphs as one of a sequence start indicator, an object identifier, an object orientation identifier, an insertion location, an insertion approach vector, a begin insertion indicator, or a sequence terminator.

6. The method of claim 5, further comprising classifying at least one of the identified hieroglyphs based on a base symbol in the at least one identified hieroglyph.

7. The method of claim 1, comprising waiting, prior to causing the articulated robotic arm to carry out instructions, to receive an additional hieroglyph; wherein causing the robotic arm to carry out instructions is responsive to receiving the additional hieroglyph.

8. The method of claim 7, wherein the hieroglyph is part of a series of hieroglyphs and the additional hieroglyph is one of a begin insertion indicator or a sequence terminator.

9. The method of claim 1, wherein causing, by the control system, the articulated robotic arm to carry out the instructions translated from the identified hieroglyph comprises executing the one or more instructions to insert an object into the fabrication machine build space.

10. The method of claim 1, comprising causing the articulated robotic arm to carry out an insertion completion sequence.

11. A system using hieroglyphs for communication in a rapid fabrication environment, the system comprising:
- a digital camera;
- an articulated robotic arm; and
- a control system for the articulated robotic arm, the control system configured to perform operations of:
  - receiving images of a build space for a fabrication machine;
  - identifying a plurality of hieroglyphs present in the images, the plurality of hieroglyphs including at least a first hieroglyph and a second hieroglyph generated by the fabrication machine, wherein the control system identifies the first hieroglyph prior to the fabrication machine generating the second hieroglyph;
  - translating the identified plurality of hieroglyphs into one or more instructions for manipulation of the articulated robotic arm; and
  - causing the articulated robotic arm to carry out the instructions translated from the identified plurality of hieroglyphs.

12. The system of claim 11, the control system configured to receive the one or more images from the digital camera, wherein the digital camera is configured to obtain the one or more images of the fabrication machine build space at a predetermined frame rate that is at least as fast as a laser beam movement rate used by the fabrication machine.

13. The system of claim 11, the control system configured to identify the plurality of hieroglyphs based on a vocabulary for a Hieroglyphic Machine Interface Language.

14. The system of claim 11, wherein the second hieroglyph comprises a base symbol and one or more additional modifier symbols, and wherein the control system is configured to identify an operation corresponding to the base symbol and identifying parameters for the operation indicated by one or more values associated with the one or more additional modifier symbols.

15. The system of claim 11, the control system configured to classify each of the identified hieroglyphs as one of a sequence start indicator, an object identifier, an object orientation identifier, an insertion location, an insertion approach vector, a begin insertion indicator, or a sequence terminator.

16. The system of claim 15, the control system configured to classify at least one of the identified hieroglyphs based on a base symbol in the at least one identified hieroglyph.

17. The system of claim 11, the control system configured to wait, prior to causing the articulated robotic arm to carry out instructions, to receive an additional hieroglyph; wherein causing the articulated robotic arm to carry out instructions is responsive to receiving the additional hieroglyph.

18. The system of claim 11, comprising a vision system configured to recognize the hieroglyph from a sequence of images obtained by the digital camera, where no single image in the sequence of images contains a complete image of the hieroglyph.

19. The system of claim 11, wherein the control system is configured to execute the one or more instructions translated from the identified hieroglyph to insert an object into the fabrication machine build space.

20. The system of claim 11, wherein the control system is not otherwise communicatively coupled to a rapid fabrication machine in the rapid fabrication environment.

* * * * *